United States Patent
Romano

(10) Patent No.: US 9,719,269 B2
(45) Date of Patent: Aug. 1, 2017

(54) PREFABRICATED POOL

(71) Applicant: Avi Victor Romano, Ramat Hasharon (IL)

(72) Inventor: Avi Victor Romano, Ramat Hasharon (IL)

( * ) Notice: Subject to any disclaimer, the term of this patent is extended or adjusted under 35 U.S.C. 154(b) by 91 days.

(21) Appl. No.: 14/705,993

(22) Filed: May 7, 2015

(65) Prior Publication Data
US 2015/0337551 A1 Nov. 26, 2015

(30) Foreign Application Priority Data
May 22, 2014 (IL) .......................................... 232751

(51) Int. Cl.
*E04H 4/00* (2006.01)
*B29C 39/00* (2006.01)
*B29L 31/52* (2006.01)

(52) U.S. Cl.
CPC ......... *E04H 4/0093* (2013.01); *B29C 39/003* (2013.01); *E04H 4/005* (2013.01); *E04H 4/0043* (2013.01); *E04H 4/0087* (2013.01); *B29L 2031/5254* (2013.01)

(58) Field of Classification Search
CPC ... E04H 4/0075; E04H 4/0081; E04H 4/0087; E04H 4/0093; E04H 4/0018; E04H 4/0031; E04H 4/0037; E04H 4/0043; E04H 4/005; E04H 2004/0068; B29C 39/003; B29C 39/02
USPC ...................... 4/506; 52/741.12, 169.7, 169.8
See application file for complete search history.

(56) References Cited

U.S. PATENT DOCUMENTS

| | | | | |
|---|---|---|---|---|
| 2,902,157 A | * | 9/1959 | Culver | E04H 4/0093 210/167.13 |
| 3,031,801 A | * | 5/1962 | Leuthesser | E04H 4/0075 249/DIG. 3 |
| 3,748,810 A | * | 7/1973 | Mattingly | E04H 4/0081 52/169.7 |
| 4,060,946 A | * | 12/1977 | Lang | E04H 4/0043 249/DIG. 3 |
| 4,406,439 A | * | 9/1983 | Garter | E04H 4/0081 249/10 |
| 4,756,033 A | * | 7/1988 | Schelfhorst | B65D 88/08 4/488 |
| 6,260,313 B1 | * | 7/2001 | Stegmeier | E04H 4/142 4/488 |
| 6,389,758 B1 | * | 5/2002 | Martin, Jr. | E04C 1/40 52/125.2 |
| 6,606,836 B2 | * | 8/2003 | Miller | B28B 7/0008 405/129.55 |
| 6,637,162 B1 | * | 10/2003 | Holland | E04H 4/0093 4/506 |
| 2006/0277851 A1 | * | 12/2006 | Hudon | E04H 4/0043 52/270 |
| 2007/0271861 A1 | * | 11/2007 | Sugranes Arimany | E04H 4/0087 52/169.7 |

(Continued)

*Primary Examiner* — J. Casimer Jacyna
(74) *Attorney, Agent, or Firm* — Daniel J. Swirsky; AlphaPatent Associates Ltd.

(57) ABSTRACT

A prefabricated concrete pool including concrete walls and a pan-formed concrete floor, as well as a method of fabricating a prefabricated swimming pool, the method including erecting an external wall form, erecting an internal wall form opposing the external wall form, and positioning pan forms on a floor form.

8 Claims, 7 Drawing Sheets

(56) References Cited

U.S. PATENT DOCUMENTS

2011/0243664 A1* 10/2011 Sullivan ................... E04H 4/00
405/53
2011/0271436 A1* 11/2011 Kite .................. A61H 33/6005
4/509

* cited by examiner

PREFABRICATED POOL

CROSS-REFERENCE TO RELATED APPLICATIONS

This application claims the benefit of priority from Israel Patent Application No. 232751, filed May 22, 2014, the disclosure of which is incorporated herein by reference.

TECHNICAL FIELD

The invention, in some embodiments thereof, relates to prefabricated pools and, more particularly, but not exclusively, to a prefabricated concrete pool.

BACKGROUND

Prefabricated pools are generally manufactured so that relatively little assembly work, if any at all, is required on-site. Contrary to concrete pools which are built on-site, prefabricated pools are generally formed as a single shell at the factory from a material such as fiberglass or other relative strong, lightweight plastic material such as PVC (polyvinyl chloride). They may also be formed from a metal, which may be coated with a material which may prevent corrosion.

There may be numerous advantages to prefabricated pools compared to on-site fabricated concrete pools. One advantage may be that they may require little, if any, maintenance at all. Another advantage may be its relatively fast and simple installation since the pool arrives ready to be inserted into an excavated hole or placed above ground. Another advantage may be that they are generally lower priced than concrete pools.

Despite the above-mentioned advantages, there may also be disadvantages to prefabricated pools. One disadvantage may be that a customer typically must select a pool whose shape, size and color are predefined, with very little possibility of customizing the pool according to his or her requirements. Another disadvantage may be in the repair of damages in the pool should they occur, which may be costly and difficult to repair. Faults may occur which may result in cracking of the prefabricated pool walls and/or floors, or even in warping of the walls or their collapse. Still another disadvantage may be damage to the pool or to other equipment while hoisting the pool to its location using a crane.

It is an intention of the invention to solve the above and other problems associated with prefabricated pools known in the art.

SUMMARY

In one aspect, the invention is directed to a prefabricated concrete pool having a formwork (28) comprising:
 a floor form (25), for pouring a layer of liquidized concrete thereon, for forming a concrete floor (27);
 a peripheral external wall form (26), disposed on the floor form (25), for limiting a size of the concrete floor (27);
 a peripheral internal wall form (24), disposed above the floor form (25) and near the peripheral external wall form (26), for pouring liquidized concrete between the external (26) and internal (24) wall forms, for forming a peripheral concrete wall (40) therebetween; and
 anchoring ties (31), for anchoring the internal wall form (24) to the external wall form (26), thereby the liquidized concrete poured between the peripheral wall forms (24, 26), and the liquidized poured concrete layer attach one another while being liquidized.

BRIEF DESCRIPTION OF THE DRAWINGS

Embodiments, features, and aspects of the invention are described herein in conjunction with the following drawings.

Figure 1:
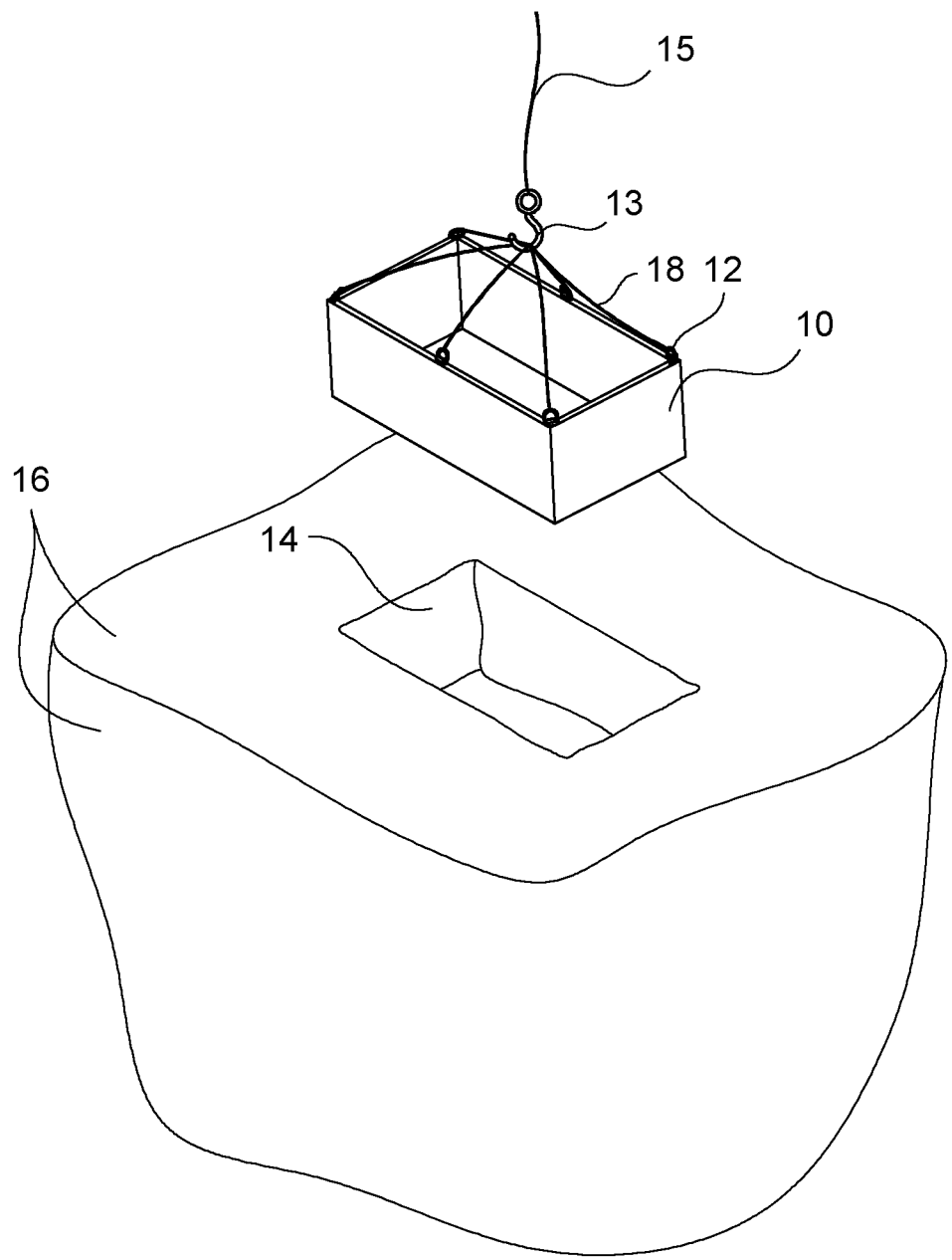
FIG. 1 schematically illustrates a perspective view of a method of installation of an exemplary prefabricated (prefab) concrete pool, according to an embodiment of the invention.

The drawings are not necessarily drawn to scale.

DETAILED DESCRIPTION

The invention will be understood from the following detailed description of embodiments of the invention, which are meant to be descriptive and not limiting. For the sake of brevity, some well-known features, methods, systems, procedures, components, circuits, and so on, are not described in detail.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

A prefabricated concrete pool according to the invention may provide the advantages offered by non-concrete prefabricated pools while overcoming many of their disadvantages. One major problem encountered in the art with prefabricated concrete pools is the occurrence of cracks when the pool is being hoisted into place. Generally, the pools are lifted by a crane to which supporting points on the walls are attached, leaving the floor unsupported. Due to the relatively large span between the walls, the cracks frequently appear on the floor or along the intersection of the floor with the walls. These cracks may eventually lead to structural failure and/or may contribute to water leakage.

Attempts to make the concrete prefabricated pools more structurally sound have generally been unsuccessful or prove to be economically unfeasible. In order to prevent the occurrence of cracks, the thickness of the floor is made relatively large, which requires that the walls also be relatively thick in order to support the weight of the floor as it is being lifted. The result is a prefabricated pool which is structurally quite large and heavy, making it costly to build and costly to install.

In order to circumvent the above problems, prefabricated pools are generally assembled on-site and include prefabricated wall sections. For example, the walls may be separately fabricated off-site and joined together on-site. The floor may be cast on-site either prior to installing of the prefabricated walls or following their installation. Disadvantages associated with this method may include longer overall on-site construction time and potential leakage along the intersection lines of the prefabricated walls with one another and also along the intersection lines with the floor.

The above problems may be overcome with a prefabricated pool whose floor span is adequately supported while the pool is hoisted into place by a crane. The support may be provided by using a pan-form system to form the floor, the beams formed by the pan-form system providing the required support. Additionally, integrally casting the wall and the floor eliminates possible cracking at the intersection between the floor and the walls. Furthermore, using a strong, lightweight concrete may provide for a relatively light, structurally-sound structure which may be readily hoisted into place by a crane, thereby preventing the formation of cracks which may potentially affect the pool's structural integrity.

Figure 2:
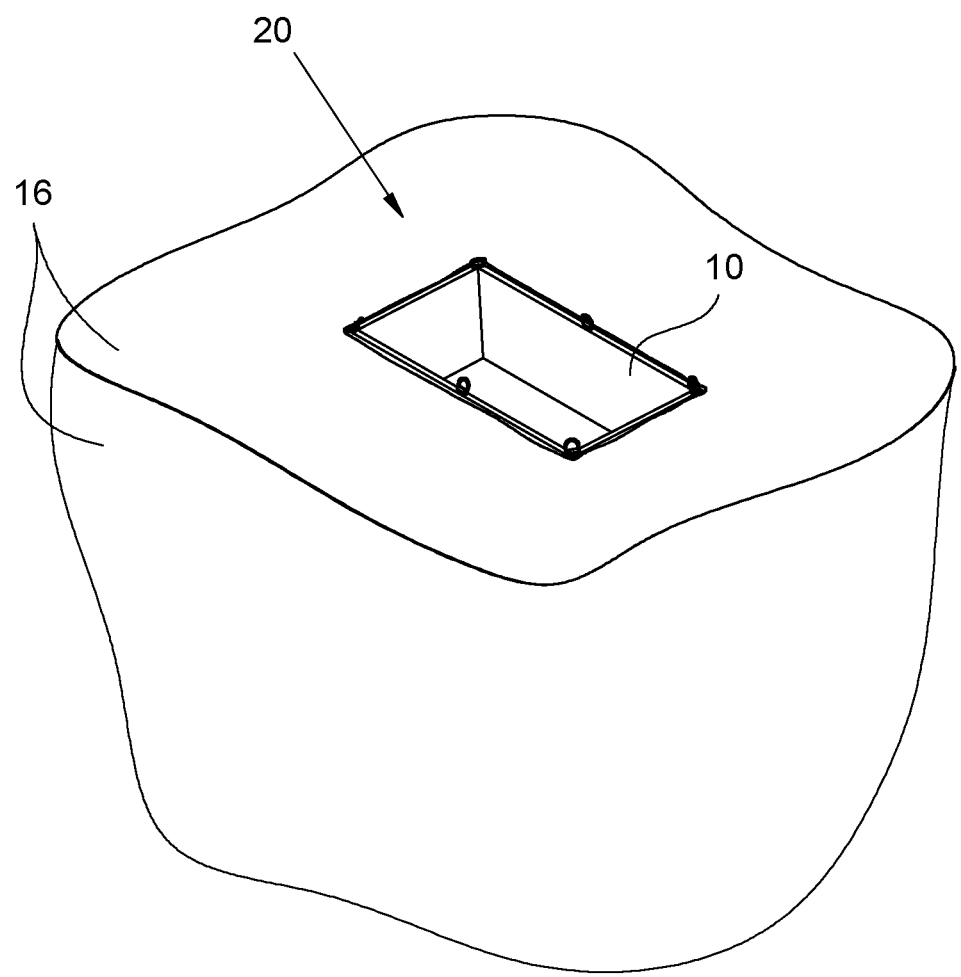
FIG. 2 schematically illustrates the prefabricated concrete pool following installation at an installation site, according to an embodiment of the invention.
Figure 3:
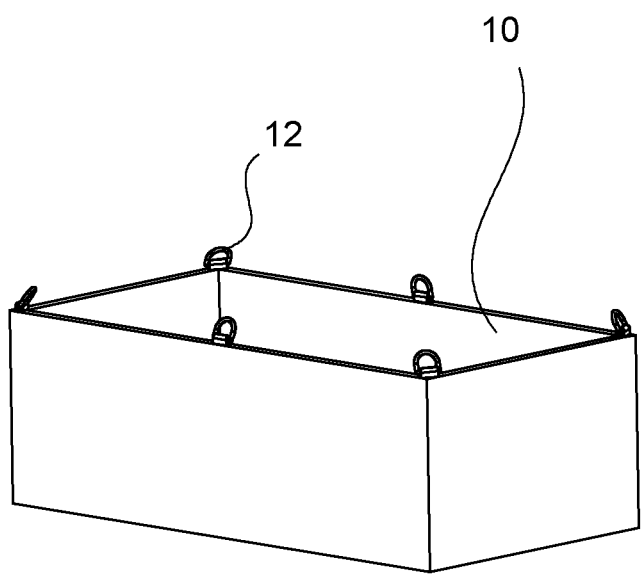
FIG. 3 schematically illustrates the prefabricated pool as a single prefabricated unit, according to an embodiment of the invention.

Reference is now made to FIG. 1 which schematically illustrates a perspective view of a method of installation of an exemplary prefabricated concrete pool 10, according to an embodiment of the invention. Reference is also made to FIG. 2 which schematically illustrates prefabricated concrete pool 10 following installation at an installation site 16, and to FIG. 3 which schematically illustrates the prefabricated pool as a single prefabricated unit, all according to an embodiment of the invention. Prefabricated concrete pool 10 is described herein with reference to a swimming pool, although the ordinary person skilled in the art may realize that the prefabricated concrete pool may have many other applications other than as a swimming pool, for example, as a decorative garden or park pool which may house plants, birds, fish, among other possible applications.

Prefabricated concrete pool 10 may be built as a single unit at a prefabrication site which may be located off-site at a remote location away from installation site 16. Prefabricated concrete pool 10 may be transported from the remote location to installation site 16 by a truck or other type of transport means suitable to accommodate a size and weight of the prefabricated pool. At installation site 16, prefabricated concrete pool 10 may be hoisted by a hoisting machine 15, for example a crane, and positioned into a swimming pool site 20. Prefabricated concrete pool 10 may include grasps 12 which may be releasably attached to a hook 13 or other grasping mechanism on crane 15 by means of steel cables 18 or other lifting cables suitable to support a weight of the pool. Grasps 12 may additionally serve as anchoring means to anchor prefabricated concrete pool 10 to swimming site 20.

Swimming pool site 20 may accommodate prefabricated concrete pool 10 sunken into the ground, for example, inside a ground opening 14 as shown. Prefabricated concrete pool 10 may additionally be configured to be placed above the ground, or partially sunken with an upper portion of the pool above the ground. Swimming pool site 20 may include a concrete surface, a soil surface, a gravel surface, or other type of firm, flat surface which may support prefabricated concrete pool 10.

Figure 4:
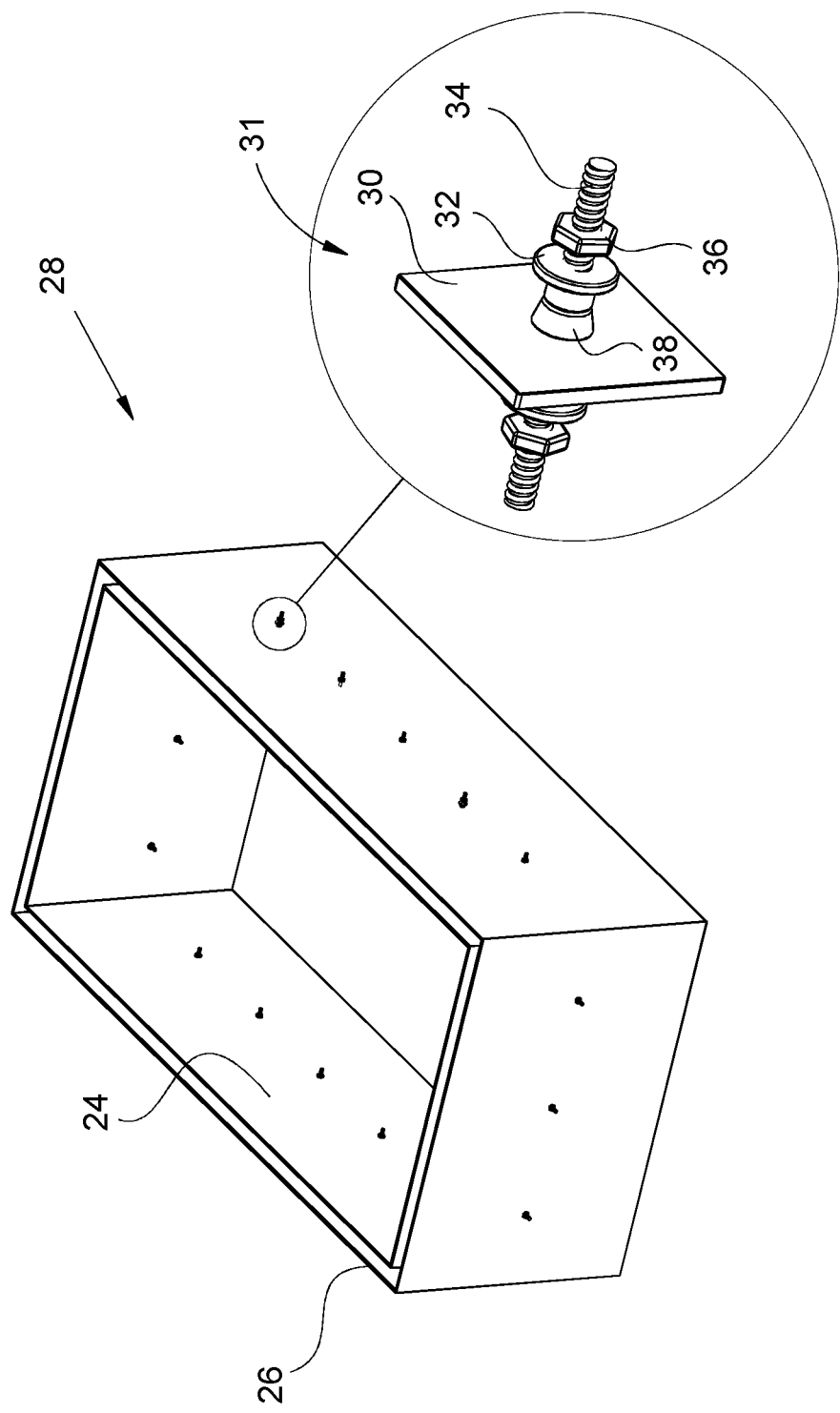
FIG. 4 schematically illustrates a perspective view of an exemplary formwork for fabricating the prefabricated concrete pool and a detailed view of an anchoring tie, according to an embodiment of the invention.
Figure 5:
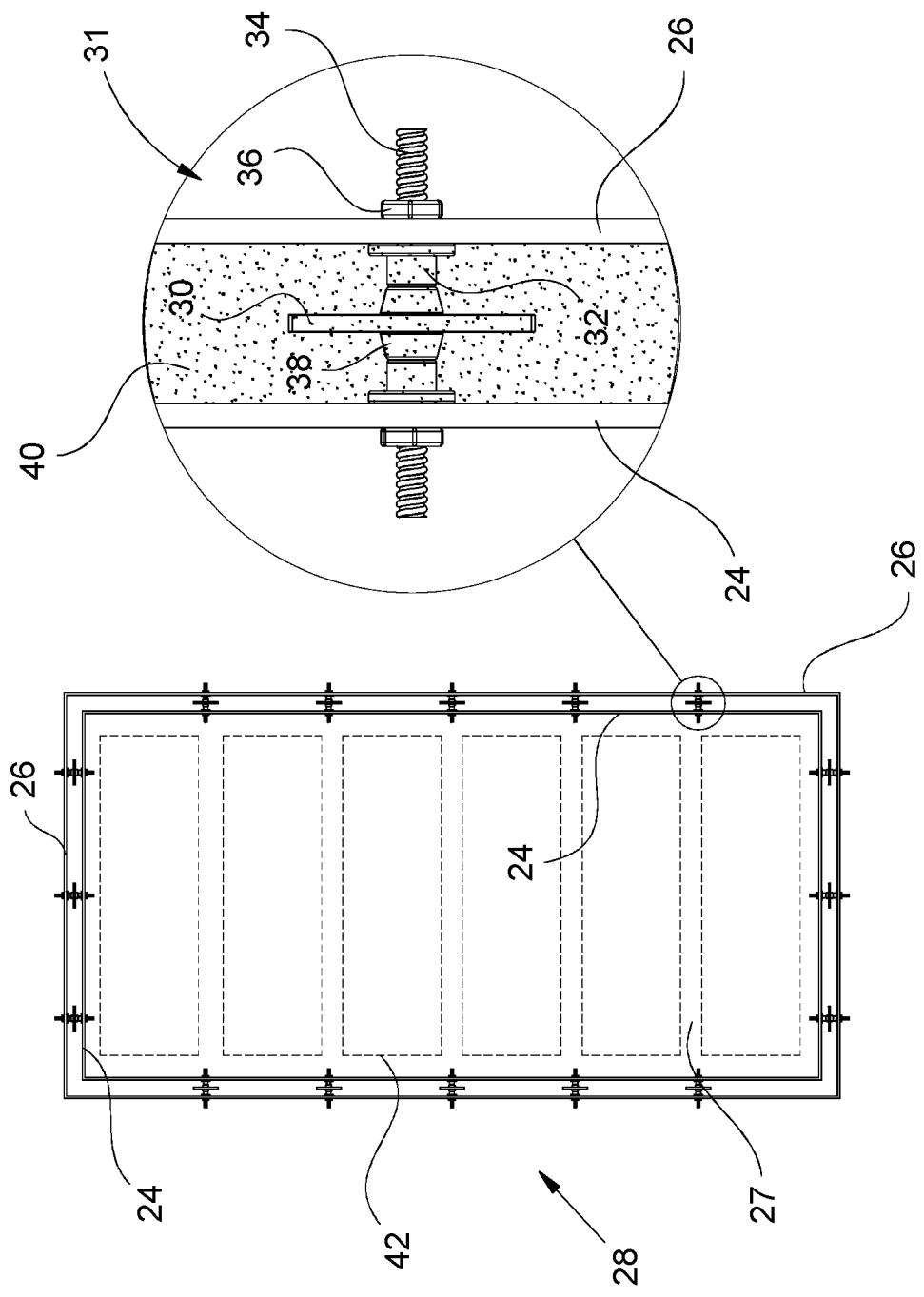
FIG. 5 schematically illustrates a top view of the exemplary formwork and a detailed view of the installation of the anchoring tie, according to an embodiment of the invention.
Figure 6:
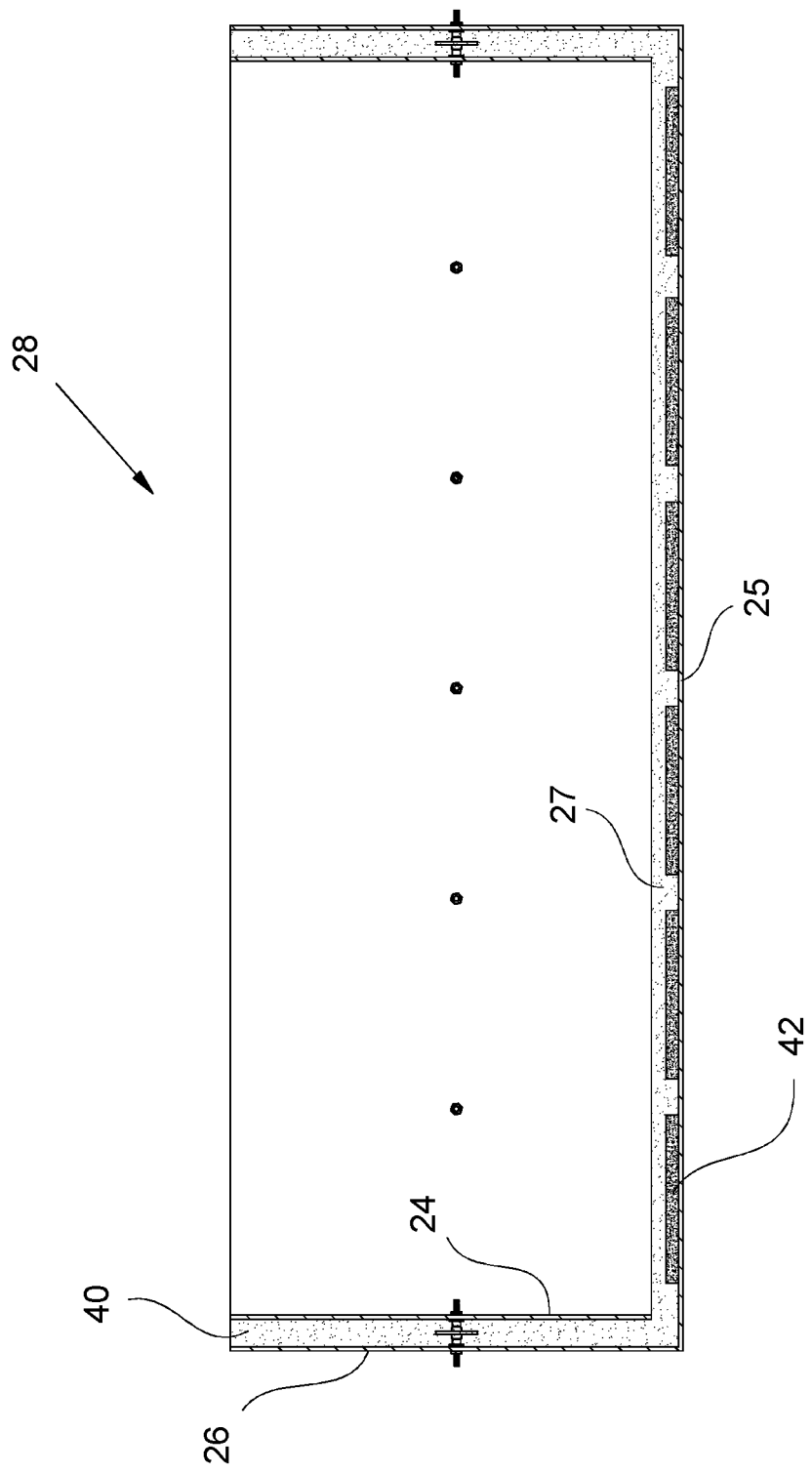
FIG. 6 schematically illustrates a side view of the exemplary formwork, according to an embodiment of the invention.

Reference is now also made to FIG. 4 which schematically illustrates a perspective view of an exemplary formwork 28 for fabricating prefabricated concrete pool 10, according to an embodiment of the invention. Reference is also made to FIGS. 5 and 6 which schematically illustrate a top view and a side view respectively, of formwork 28, according to an exemplary embodiment of the invention. Formwork 28 may be located at the off-site prefabrication site. Additionally shown in FIGS. 4 and 5 are detailed views of an anchoring tie, according to an embodiment of the invention.

Formwork 28 may include an external wall form 26, an internal wall form 24 opposing the external wall form, and a floor form 25. External wall form 26 and internal wall form 24 may form walls 40 of prefabricated concrete pool 10, and floor form 25 may be a flat surface which may accommodate pan forms 42 used to form a floor 27 of the pool. External wall form 26, internal wall form 24, and floor form 25 may be made of metal, wood, plastic or other polymeric material, or any combination thereof. Alternatively, floor form 25 may be a concrete surface, including a flat floor on which pan forms 42 may be positioned. Pan forms 42 may be made of metal, wood, plastic or other polymeric material.

Figure 7:
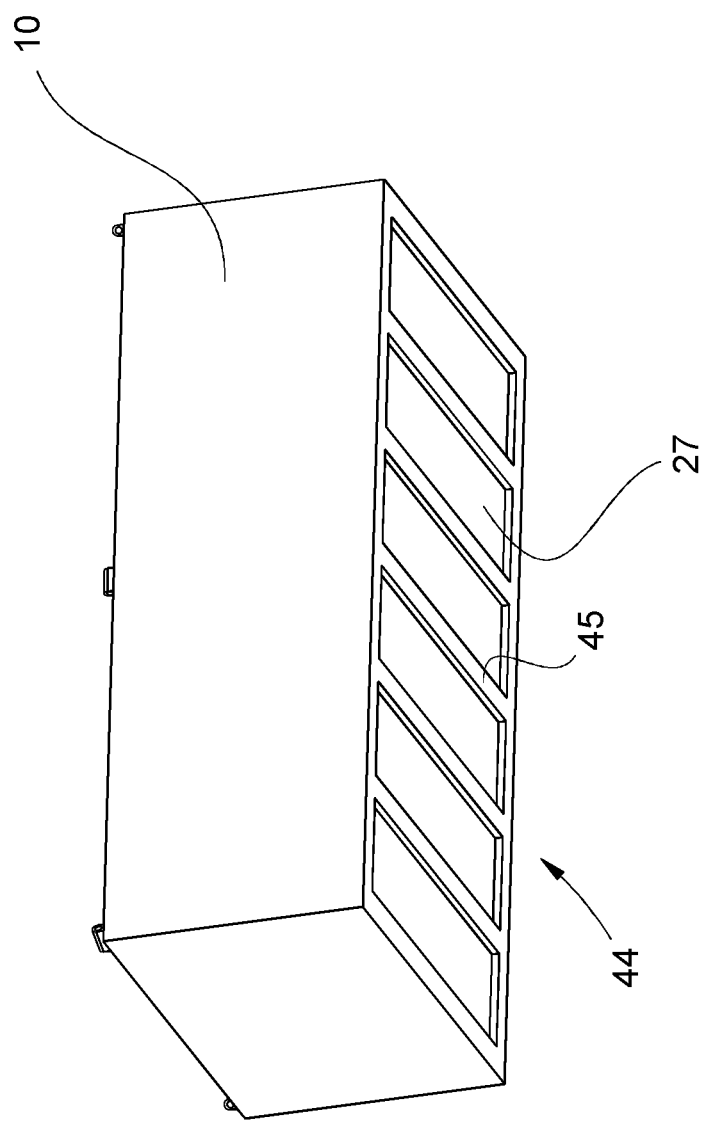
FIG. 7 schematically illustrates a perspective view showing an underside of prefabricated concrete pool including structural beams, according to an embodiment of the invention.

Referring now also to FIG. 7 which schematically illustrates a perspective view showing an underside 44 of prefabricated concrete pool 10 according to an embodiment of the invention, pan forms 42 may be removed from an underside of floor 27. Pan forms 42 may be removed once the floor is formed and lifted of floor form 25 (the whole pool may be lifted). Alternatively, floor form 25 is removable and floor 27 does not require lifting to remove floor pans 42. Pan forms 42 may form structural beams 45 on the underside of floor 27 as shown, providing support to the floor when being hoisted to swimming pool site 20. Beams 45 may additionally support floor 27 when prefabricated concrete pool 10 is installed in swimming site 20.

Walls 40 and floor 27, including beams 45, may be formed integrally from concrete poured into formwork 28 during a same concrete pouring session. Alternatively, walls 40 and floor 27 may be formed in stages, for example, by first pouring the floor and once the floor has hardened, pouring the walls. Walls 40 may be formed by pouring all the four walls during a same concrete pouring session, or may be formed in stages, for example one wall at a time, two walls at a time, or any other suitable order. The concrete used to form walls 40 and/or floor 27 may be a lightweight concrete which may include fiber strands which may be made of a polymeric material or a metallic material, or a combination of both.

Walls 40 and floor 27 may be formed to have any suitable thickness as determined to be structurally sound for transport of prefabricated concrete pool 10 to swimming site 20, for hoisting and positioning of the pool in the swimming site, and for its regular use. As an example, walls 40 may have a concrete thickness of 15 centimeters (cm), and floor 27 may have a concrete thickness of 7 cm above a concrete height of 13 cm for beams 45. Beams 45 may be spaced 80 cm apart. Walls 40 and floor 27, including beams 45, may include reinforcement steel, for example, rebar, steel wire mesh, or other reinforcement means known in the art, or any combination thereof.

In forming walls 40, external wall form 26 and internal wall form 24 may be anchored to one another by any suitable anchoring tie known in the art and which may include means to prevent water leakage through the tie once the walls are formed (and the forms removed). An example of a suitable anchoring tie may be anchoring tie 31 shown in the detailed views of FIGS. 4 and 5. Anchoring tie 31 may include a threaded rod or a bolt 34, threaded fasteners 36, a gasket 30 which may include multiple gaskets or other type of seal, spacers 32, and gasket fasteners 38.

Referring to the detailed view in FIG. 5, external wall form 26 is anchored to internal wall form 24 by bolt 34 which extends through both wall forms, and a threaded fastener 36 threaded through the bolt on each side of an exterior face of each wall form. A distance between external wall form 26 and internal wall form 24 is maintained by two spacers 32, whose positions on threaded bolt 34 are adjustable. Spacers 32 press against an inner face of the wall forms, opposing threaded fasteners 36. Gasket 30 is positioned between spacers 32, between the inner faces of external wall form 26 and internal wall form 24. Gasket 30 is configured to prevent leakage through anchoring tie 31 when the wall forms are removed and prefabricated concrete pool 10 is in use. Gasket 30 is secured in place on threaded bolt 34 by gasket fasteners 38 on each side of the gasket.

Throughout this description, prefabricated concrete pool 10 is shown in the figures as having 4 walls 40, and a single level floor 27 supported by beams 45. Similarly, formwork 28 is shown in the figures as being rectangular shaped (FIG. 5). The figures are intended to be exemplary in nature, and the ordinary person skilled in the art may realize that the principles of the invention as described herein may be applied to prefabricated concrete pools which may have other shapes, such as for example, circular, elliptical, figure-8, among other rounded shapes, or any type of regular and irregular polygonal shapes.

Thus, in one aspect, the invention is directed to a prefabricated concrete pool (10) having at least one frame with a plurality of structural concrete beams (45) for each surface (40, 27), for forming the surface in between, concrete walls surfaces (40), and a pan-formed concrete floor surface (27), where at least one of the concrete walls (40) and of the pan-formed concrete floor (27) is supported by the at least one frame, thereby making the at least one of the concrete walls (40) and of the pan-formed concrete floor (27) sufficiently flexible for preventing cracks.

The concrete of at least one of the concrete walls (40) and of the pan-formed concrete floor (27) may comprise fiber strands, thereby increasing the flexibility.

The structural beams (45) of the concrete floor (27) may be on an underside (44) of the concrete floor (27).

The concrete walls (40) may comprise leak-proof anchoring ties (31).

The anchoring ties (31) may comprise a gasket (30).

The prefabricated concrete pool (10) may further comprise grasps (12) for hoisting the prefabricated concrete pool (10) with a hoisting machine (15).

The prefabricated concrete pool (10) may further comprise grasps (12) for anchoring the prefabricated concrete pool (10) to a swimming pool site (20).

The prefabricated concrete pool (10) may comprise a swimming pool.

There is provided, according to an embodiment of the invention, a method of fabricating a prefabricated (prefab) swimming pool (10), the method including erecting an external wall form (26), erecting an internal wall form (24) opposing said external wall form (26), and positioning pan forms (42) on a floor form (25).

In accordance with an embodiment of the invention, the method additionally includes anchoring the external wall form (26) to the internal wall form (24) using a leakage-proof anchoring tie (31).

In accordance with an embodiment of the invention, the method additionally includes pouring concrete on the pan forms (42) to form a floor (27) supported by structural beams (45).

In accordance with an embodiment of the invention, the method additionally includes removing the pan forms (42) following the concrete pouring.

There is provided, according to an embodiment of the invention, a method of installing a prefabricated (prefab) concrete pool (10), the method including attaching lifting cables (18) to grasps (12) on the prefabricated concrete pool (10), hoisting the prefabricated concrete pool (10) by the lifting cables (18) using a hoisting machine (15); and moving the prefabricated concrete pool (10) to a swimming pool site (20).

In accordance with an embodiment of the invention, the method additionally includes excavating a ground opening (14).

In the figures and/or description herein, the following reference numerals (Reference Signs List) have been mentioned:

| Reference No. | Part Identification |
| --- | --- |
| 10 | Prefabricated Concrete Pool |
| 12 | Grasps |
| 13 | Hook |
| 14 | Ground Opening |
| 15 | Hoisting Machine |
| 16 | Installation Site |
| 18 | Lifting Cables |
| 20 | Swimming Pool Site |
| 24 | Internal Wall Form |
| 25 | Floor Form |
| 26 | External Wall Form |
| 27 | Floor |
| 28 | Formwork |
| 30 | Gasket |
| 31 | Anchoring Tie |
| 32 | Spacer |
| 34 | Threaded Rod |
| 36 | Threaded Fastener |
| 38 | Gasket Fastener |
| 42 | Pan Forms |
| 44 | Underside |
| 45 | Structural Beams |

The foregoing description and illustrations of the embodiments of the invention has been presented for the purposes of illustration. It is not intended to be exhaustive or to limit the invention to the above description in any form.

Any term that has been defined above and used in the claims, should to be interpreted according to this definition.

The reference numbers in the claims are not a part of the claims, but rather used for facilitating the reading thereof. These reference numbers should not be interpreted as limiting the claims in any form.

What is claimed is:

1. A prefabricated concrete pool comprising a formwork (28) comprising:
- a floor form (25), for pouring a layer of liquidized concrete thereon, for forming a concrete floor (27);
- a peripheral external wall form (26), disposed on said floor form (25), for limiting a size of said concrete floor (27);
- a peripheral internal wall form (24), disposed above said floor form (25) and near said peripheral external wall form (26), for pouring liquidized concrete between said external (26) and internal (24) wall forms, for forming a peripheral concrete wall (40) therebetween; and
- anchoring ties (31), each threaded through said internal wall form (24) and said external wall form (26), for anchoring said internal wall form (24) to said external wall form (26), for applying said disposition of said peripheral internal wall form (24) above said floor form (25), thereby said liquidized concrete poured between said peripheral wall forms (24, 26), and said liquidized poured concrete layer attach one another while being liquidized, wherein said forms (25, 26, 24) are not fixed to a ground, thereby said concrete floor (27) and said peripheral concrete wall (40) are transportable.

2. A prefabricated concrete pool according to claim 1 wherein the concrete of at least one of said peripheral concrete wall (40) and of said concrete floor (27) comprises fiber strands, thereby increasing flexibility.

3. A prefabricated concrete pool according to claim 1, further comprising:
- non-concrete plates (42), disposed on said floor form (25) for pouring said concrete layer thereon for reducing thickness thereof for reducing weight thereof, thereby concrete disposed on said floor form (25) between said non-concrete plates (42) comprise structural beams (45) of said concrete floor being on an underside of said concrete floor.

4. A prefabricated concrete pool according to claim 1 wherein said anchoring ties (31) are leak proof.

5. A prefabricated concrete pool according to claim 4 wherein said anchoring ties comprises a gasket.

6. A prefabricated concrete pool according to claim 1, further comprising grasps for hoisting the prefabricated concrete pool with a hoisting machine.

7. A prefabricated concrete pool according to claim 1 further comprising grasps for anchoring the prefabricated concrete pool to a site.

8. A prefabricated concrete pool according to claim 1 comprising a swimming pool.

* * * * *